United States Patent [19]

Gafney

[11] 4,298,439
[45] Nov. 3, 1981

[54] PRODUCING LONG LIFE DISPROPORTIONATION PRODUCTS FROM A PHOTO REDOX AGENT USEFUL AS A REDUCING MEDIUM FOR WATER, AND THE LIKE

[75] Inventor: Harry D. Gafney, Woodbury, N.Y.

[73] Assignee: Research Foundation of the City University of New York, New York, N.Y.

[21] Appl. No.: 176,786

[22] Filed: Aug. 11, 1980

[51] Int. Cl.³ .......................... B01J 19/12; C01B 3/08
[52] U.S. Cl. ......................... 204/157.1 W; 204/158 R; 423/259; 423/657
[58] Field of Search ................ 204/157.1 W, 157.1 R, 204/157.1 L, 158 N, 158 R, 158 L, 162 R; 423/259, 657

[56] References Cited

U.S. PATENT DOCUMENTS

| | | | |
|---|---|---|---|
| 4,045,315 | 8/1977 | Fletcher | 204/157.1 W |
| 4,060,468 | 11/1977 | Castner | 204/162 R |
| 4,173,521 | 11/1979 | Wade | 204/157.1 R |

OTHER PUBLICATIONS

Cuomo et al., IBM Technical Disclosure Bulletin, vol. 19, No. 6 (Nov. 1976), p. 2359.

Primary Examiner—Howard S. Williams
Attorney, Agent, or Firm—Laurence R. Brown

[57] ABSTRACT

The lifetime of the photo redox induced disproportionation products of ruthenium polypiridine complexes is significantly increased from about two milliseconds in a liquid phase to greater than thirty-six hours by depositing the complexes in the pores of thirsty glass, thus making possible their use in chemical reactions such as the reduction of water to produce hydrogen at room temperatures.

A photochemical reaction system is thereby formed within the situs of the porous glass which adsorbs the photo redox agent and permits diffusion of hydrogen out as an end product while retaining its transparency and characteristics for long periods of use.

The porous glass medium withstands high temperatures and processes of organizing the reaction system by depositing as complementary layers various agents and catalysts necessary in a chemical reaction system from solutions and at temperatures otherwise incompatible with liquid redox agents or other site materials.

24 Claims, 3 Drawing Figures

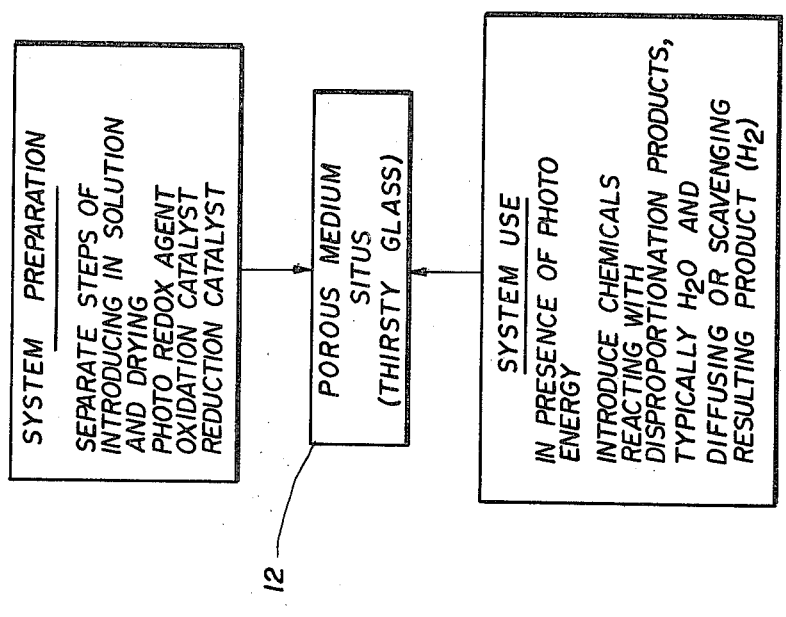
FIG.3
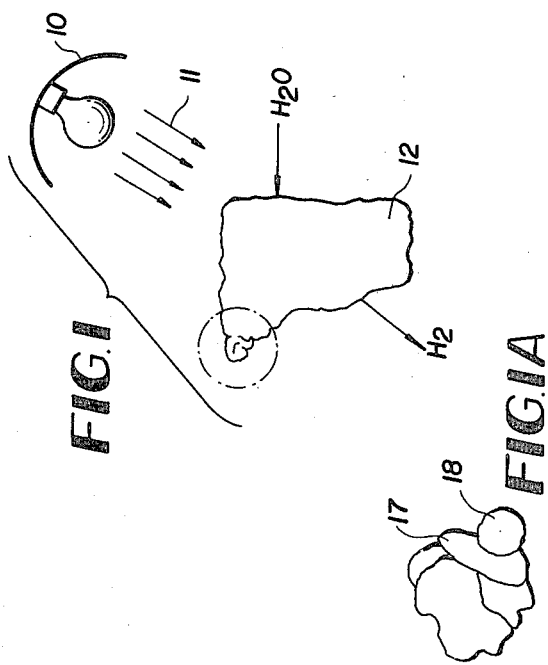
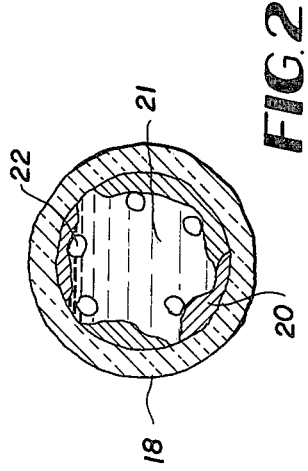

PRODUCING LONG LIFE DISPROPORTIONATION PRODUCTS FROM A PHOTO REDOX AGENT USEFUL AS A REDUCING MEDIUM FOR WATER, AND THE LIKE

TECHNICAL FIELD

This invention relates to improving the lifetime of photoinduced disproportionation products of a redox agent, and more particularly it relates to a reaction system for photo redox agents and corresponding processes for utilization of photoinduced disproportionation products as reducing agents for water, and the like.

BACKGROUND ART

Sorbent materials and the theory of sorption and ion exchange are well known as set forth for example in the Chemical Engineers' Handbook, John H. Perry, Fourth Edition, Published 1963, McGraw Hill, Section 16. Also, sorption operations and procedures are well known, as exemplified therein. While resins and other substances are known, it is important for purposes of this invention to have a light transparent sorbent material of long life with very high surface areas or internal porosity and yet capable of acting as a reaction system for various reactions in preparation of a matrix site for desired end reactions. In such reactions chemical inertness, strength and usefulness in the presence of high temperatures are desirable characteristics. Thus, the highly preferred class of sorbent materials found to produce these characteristics in accordance with the needs of this invention are the classes of sorbent materials known as silica gels or thirsty glass.

Exploratory studies have been made with sorbent synthetic resins and the like for electron transfer or redox reactions, where valences are changed without other changes to the solutions being treated. These reactions have been theorized to be suitable for decomposing water. However, in the past there has been little success in decomposing water on a practical scale because of a major problem imposed by the extremely short transitory time duration of the disproportionation products of redox agents.

One particular redox reaction, namely using the ruthenium polypridine complex, that has been theorized as a possible candidate for decomposing water in the photochemical behavior of Ru(bpy)$_3$Cl$_2$ (bpy denoting 2,2' bipyridine) as a reduction agent. Thus, a photoinduced disproportionation of Ru(bpy)$_3^{2+}$ is explained in the following manner:

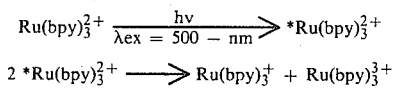

In the past, the yield of Ru(bpy)$_3^+$ is low, $\phi \sim 10^{-3}$, and the lifetime short, $\sim 2$ milliseconds. Thus, the very short transitory lifetime of this reaction has ruled it out in the past as a successful candidate for decomposing water with any promise of practical yields. Even these experiments in the past have required consumption of expensive external electrons from a suitable source.

Thus, it has not been feasible in the past to achieve the following necessary criteria for obtaining reduction products successfully such as hydrogen from water with photo redox techniques.

Other kinds of reactions are known which cannot take place at ambient room temperatures but must be processed at highly elevated temperature ranges, which in an energy short environment requires use of critical resources.

Prior art related literature for photo redox reduction techniques includes:

U.S. Pat. No. 4,045,315 Fletcher et al.—Aug. 30, 1977 showing a redox method of solar photolysis of water in a transparent container or on glass fibers in the presence of a water soluble photo oxidizable reagent such as a europium salt and an insoluble hydrogen recombination catalyst such as platinum.

Other known reactions and procedures related to the novel and new overall combination of means and process steps of this invention are found in various publications and known in the art as typified by the following:

Ruthenium polypyridine disproportionation, G. Navon and N. Sutin, *Inorganic Chemistry*, 13, 2159 (1974).

Photo reduction of water by Ru(bpy)$_3^{2+}$ as reported, G. Sprintschnik, H. W. Sprintschnik and D. G. Whitten, *Journal of American Chemical Society*, 98, 2337 (1976), has not thereafter been successfully reproduced, G. L. Gaines, P. E. Behnken and S. J. Valenty, ibid., 100, 6549 (1978); S. J. Valenty and G. L. Gaines, ibid., 99, 1285 (1977); G. Sprintschnik, et al., ibid., 99, 4947 (1977).

Thirsty glass characteristics, T. H. Elmer et al., *Journal of American Ceramic Society*, 53, 171 (1970).

Increased lifetime of pyrene in the triplet state when adsorbed to glass was reported by J. W. Sutherland and P. L. Piciulo, *Journal of American Chemical Society*, 101, 3123 (1979). Various hydrocarbon radicals formed by UV photolysis of alkoxy were stable for long periods of time in thirsty glass as reported by E. Melamud, M. G. Reisner and U. Garbatski, *Journal of Physical Chemistry*, 77, 1023 (1973); A. Masakazu, et al., *Bulletin of the Chemical Society of Japan*, 50, 31 (1977); C. L. Gardner and E. J. Casey, *Canadian Journal of Chemistry*, 46, 207 (1968).

DISCLOSURE OF THE INVENTION

A photoinduced disproportionation occurs in the behavior of Ru(bpy)$_3$Cl$_2$, where bpy denotes 2,2'-bipyridine. This disproportionation of Ru(bpy)$_3^{2+}$ is indicated as follows:

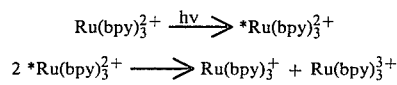

Yield increases are unexpectedly large over this activity in fluid media when the reaction takes place in porous glass known as thirsty glass, and even more significantly the lifetime of the disproportionation products is increased from about two milliseconds to more than thirty-six hours.

Various techniques are used for the use of the thirsty glass as a site for and element of a reaction system for using the long tenure disproportionation products in reduction of substances such as water to produce H$_2$. The hydrogen is removable by diffusion from the system because of its weak adsorption to the glass as found by this invention.

This system permits entry of catalysts such as platinum oxide or platinum black for increasing the yield of hydrogen, and is ideal in long lasting characteristics and ability to withstand high processing temperatures and various kinds of processing chemical reactions which would be inconsistent in other systems.

The utilization of the disproportionation products in chemical reactions such as the reduction of water is made feasible by this invention because of the ability to use the porous glass site in a system which provides long term stability of the disproportionation products.

Further features, objectives, examples, and advantages of the invention are set forth throughout the following specification, claims and drawing.

BRIEF DESCRIPTION OF THE DRAWINGS

FIG. 1 is a sketch of a system using a porous media situs for reducing water with photo energy in accordance with this invention;

FIG. 2 is a diagrammatic sketch, in cross section, of a cavity in the porous medium as used in accordance with this invention; and FIG. 3 is a reaction system sketch showing pertinent steps in preparation and use.

PREFERRED EMBODIMENT OF THE INVENTION

As shown in FIG. 1 of the drawing this invention is related to photo-induced chemical reactions as suggested by the lamp 10, and emanating photo energy 11 impinging upon the photochemical reaction system 12, where such reactions take place as the reduction of water or some other input compound to produce hydrogen, etc., as indicated by the input and output arrows.

The reaction system of this invention utilizes a transparent porous sorbent medium, preferably thirsty glass, as indicated by the enlarged portion of the medium (FIGS. 1a and 2) representing the sorbent medium within the phantom lined circle of FIG. 1. This glass, typically Corning Code 7930, has randomly spaced cavities 17, 18, etc. of the order of 70 A°. The glass has the characteristics of being slightly acidic and transparent. It is a sorbent medium which permits solutions to flow into its pores. The reactor system body 12 may be a four mm thick Corning Code 793 piece of thirsty glass two cm wide by four cm long. These glasses typically have a surface area within the cavities of about $130^{m2}$/gm, which as hereinafter shown is utilized by depositing thereon the various chemical agents used in accordance with this invention so that they can react in the presence of photo energy transmitted into the cavities by means of the transparency of the glass.

Typically as schematically shown in FIG. 2 in the cavity of cell 18 within the thirsty glass reaction site body 12, at least a first chemical substance 20 is deposited on the internal cavity walls of cell 18 to react there in situ with an absorbed or adsorbed liquid reagent 21 when the chemical reaction is induced by photo energy 11. The deposit of a second (or more) chemical substance 22 may follow to provide a further reactant or catalyst for the desired process in the reaction system 12.

The chart layout of FIG. 3 typifies this procedure of system preparation and use in a more specific example of a photo redox reaction system. Thus, a first step of introducing a photo redox agent in solution and drying it is taken before proceeding with further separate steps of depositing oxidation and reduction catalysts, etc. in a like manner.

After this, the system is used in the presence of photo energy when chemicals are introduced into the reactor that may react with the redox disproportionation products. Thus, in accordance with one novel feature of this invention water may be reduced to produce hydrogen which is readily diffused out of the system.

Other examples and details are set forth throughout the following specification and claims.

EXAMPLE 1

A photo redox system was fashioned within a sorbent porous glass matrix Corning Code 7930 with transparency=320 nm having a three dimensional array of 70 A° cavities and a cavity surface area in the order of $130^{m2}$ per gram of glass, and the order of $1.2 \times 10^{18}$ cavities per gram.

Aqueous solutions of Ru(bpy)$_3$Cl$_2$ were adsorbed into the glass and then vacuum dried to remove the solvent to deposit in the cavities $10^{-6}$ moles of Ru(bpy)$_3^{2+}$ per gram of glass. The weak acid ion exchange of the glass binds Ru(bpy)$_3^{2+}$ ions to anionic silinol sites with approximately 3 ions per cavity.

Upon irradiation with either 457.9 nm from an ionized argon laser or white light ($\lambda \leq 350$ nm) from a 350 W mercury arc lamp the disproportionation 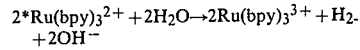 with nhv representing some number of existing photons. No difference in disproportionation was detected for the different light sources. This was compared with the same reaction in a fluid solution rather than the glass matrix with the observed comparative lifetimes of the disproportion products being about 2 m.s. in the liquid phase and over 36 hours in the glass matrix.

The glass and solution is kept air free during irradiation.

EXAMPLE 2

Same as Example 1, except with Fe(bpy)$_3^{2+}$ or Os(bpy)$_3^{2+}$, Co(phen)$_3^{3+}$, Fe(TPP)Cl, paraquat and other polypridine or complexes, or photo redox or reaction agents.

EXAMPLE 3

After the deposit of the redox agent as in the former examples, the glass matrix cavities are filled with water by soaking.

Then after irradiation and in the presence of the disproportionation products the following reduction reaction takes place at room temperatures:

$$2^*Ru(bpy)_3^{2+} + 2H_2O \rightarrow 2Ru(bpy)_3^{3+} + H_2 + 2OH^-$$

The H$_2$ is weakly adsorbed to the glass and thus is readily removed by diffusion..

EXAMPLE 4

Other reduction reactions take place with disproportionation products including the reduction of water by the radical action of methyl viologen (paraquat) in the presence of a platinum catalyst. EDTA ethylenedianinetriacetate adsorbed in the glass matrix can be used as a redox agent to provide an electron donor.

EXAMPLE 5

Because of the transparency of the water to light, a catalyst of the group platinum, $PO_2$ or platinum black is deposited on the cavity walls to concentrate the photo energy on the reduction of water to obtain hydrogen, resulting in a far greater output yield.

The dried photo redox deposits do not interfere with a further procedure of depositing the catalyst in a solution that can enter the porous medium. Solvents can be water, alcohols or cyclohexane. The amount of substrate adsorbed into the glass is controlled by varying the concentration of the solution and the time in contact with the glass by soaking in the solution. When removed from the solution the surface of the glass is rinsed with the solvent to prevent a layering of the substrate on the surface of the glass, and then the glass is dried in a vacuum oven under reduced pressure.

Additional reagents can be placed in the glass by repeating the process of soaking in solution and drying. Preferably if one reagent is a quencher, the adsorption of the quencher should precede the adsorption of the donor.

Since the solvent is removed after adsorbing each reagent, the solvents do not need be miscible. This potential enables the glass matrix to be an ideal situs for a photochemical reaction system using different reagents not possible to combine in a solution in such intimate surroundings as to permit the chemical interrelationships to proceed. Also the weak acid nature of the glass is important in the adsorption process of some of the reagents which are enhanced by electrostatic interactions, and therefore are held bonded to the glass, and will not tend to wash out in the presence of later applied water or other solvents.

In general, the reagents are non-homogeneously deposited and distributed wtihin the glass cavities, and the capacity will depend upon the molecular sizes of the reagents. The surface of the cavities within the glass consists of Si-OH units.

EXAMPLE 6

A solution of $Ru(bpy)_3Cl_2$ is adsorbed into the glass to deposit in the order of 3 molecules of $Ru(bpy)_3Cl_2$ per cavity.

EXAMPLE 7

Saturating the glass with degassed $CCl_4$ inhibitor solution acting as an $e_{aq}^-$ scavenger, the photochemical production of $Ru(bpy)_3^+$ was not changed.

EXAMPLE 8

An aqueous solution of platinic acid and NaOOCH at 0° C. was adsorbed into the glass. Then reduction to platinum black is induced by heating the glass to about 200° C. The glass will have a greyish tint.

EXAMPLE 9

Platinum oxide is formed by fusion of chloroplatinic acid and $NaNO_3$ at 550° C. with extraction of the soluble salts. The chloroplatinic acid is adsorbed into the glass and dried. Repetitive soakings in concentrated $NaNO_3$ solutions and drying after each soaking saturates the glass with $NaNO_3$. The glass is heated in a muffel furnace at 450°-500° C. until a reddish brown color is present in the glass. A deposit of $PtO_2$ occurs on glass surfaces.

EXAMPLE 10

Ruthenium oxide is deposited as a catalyst for the oxidation of the water with aqueous solutions of $RuCl_3$ adsorbed in the glass and heating in air at 120° C. for one week.

Having thus advanced the state of the art the various novel aspects of this invention believed descriptive of the nature and spirit of the invention are set forth in the claims.

INDUSTRIAL APPLICATION

A photochemical reaction system uses thirsty glass as a porous media for photo-induced chemical reactions. Thus, disproportionation products of a photo redox, formerly transitory in nature, are given a long life so that they can be used in reduction of chemicals such as water to obtain hydrogen over long time periods because of stability of the reaction system.

I claim:

1. The method of disproportionately increasing the lifetime of photoinduced disproportionation products of a photo redox agent comprising the steps of,
   introducing the photo redox agent into the pores of a transparent porous sorbent medium presenting an array of internal cavities, and
   producing long life disporportionation products by transmission of photo energy into said medium to react with the photo redox agent situate in the pores of said medium.

2. The method defined in claim 1 wherein the agent introduced into the medium is a polypyridene complex fluid solution adsorbed into the medium and vacuum dried to remove substantially all the solvent.

3. The method defined in claim 1 wherein the medium into which the agent is introduced is porous glass containing a random three dimensional array of cavities.

4. The method of claim 3 wherein the glass has cavity sizes of the order of 70 A°.

5. The method defined in claim 1 including the further step of introducing a compound into the porous medium with said agent which reacts with the disproportionation products.

6. The method defined in claim 5 wherein the compound is water which reacts to effect dissociation of hydrogen from the water molecule.

7. The method defined in claim 6 including the step of introducing the catalyst $PtO_2$ as a surface deposit in the cavities of said medium to increase the yield of hydrogen.

8. The method defined in claim 7 wherein the medium is porous glass including the introduction of the catalyst into the medium by the steps of,
   adsorbing into the glass an aqueous solution of platinic acid and NaOOCH at 0° C., and
   heating the glass to the order of 200° C. to reduce the solution to platinum black.

9. The method defined in claim 6 including the step of introducing the catalyst ruthenium oxide into the medium as a surface deposit in the cavities to increase the oxidation yield of the oxygen molecule from the water.

10. The method defined in claim 9 wherein the medium is porous glass including the introduction of the catalyst into the medium by the steps of, adsorbing an aqueous solution of $RuCl_3$ into the glass and heating the glass in air at 120° C. for one week.

11. The method defined in claim 5 including the introduction of the compound into the medium by the steps of, saturating the pores of a glass medium having $10^{-6}$ moles of $Ru(bpy)_3Cl_2$ per gram of glass with distilled water after coating the cavity surfaces within the glass with a catalyst from the group Pt, PtO and $PtO_2$ in a quantity not seriously affecting the transparency of the glass.

12. The method defined in claim 11 including the recovery of hydrogen by the steps of, diffusing the hydrogen from the pores of the glass.

13. The method of claim 5 wherein the medium reacting with the disporportionation products of the redox agent is methyl viologen.

14. The method defined in claim 1 including the introduction of water into the medium in the presence of the redox agent by the steps of, depositing the redox agent and a catalyst in the cavities of the medium, and thereafter adsorbing water into the pores of the glass.

15. The method defined in claim 1 wherein the step introducing the photo redox agent comprises the sub steps of adsorbing a liquid solution of $Ru(bpy)_3Cl_2$ into the glass and vacuum drying to remove the liquid.

16. A photochemical reaction system comprising in combination,
  a transparent porous sorbent medium having an array of internal cavities, and
  a solution introduced within the cavities of the medium including a photo redox agent and a chemical reacting with photoinduced disproportionation products of the photo redox agent, all retained within said medium without significant loss of transparency thereby to permit transmission of photo energy into the site of the photo redox agent.

17. The reaction system of claim 16 wherein the medium is thirsty glass.

18. The reaction system of claim 16 wherein the redox agent is a ruthenium bipyridene complex.

19. The reaction system of claim 18 wherein the chemical is water.

20. The reaction system of claim 16 wherein the chemical is water.

21. The reaction system of claim 20 including a platinum catalyst deposited on the surface area of the sorbent medium cavities.

22. The reaction system of claim 20 including the catalyst ruthenium oxide deposited on the surface area of the sorbent medium cavities.

23. The method of employing thirsty glass as a chemical reaction situs comprising the steps of,
  depositing on the walls of the cavities within said glass from a solution passed into the pores of the glass a first chemical and withdrawing the solution,
  thereafter depositing by a like procedure on the walls of the cavities to supplement the deposits of first chemical a second chemical, and
  introducing an agent into the cavities to react with said chemicals.

24. The method as defined in claim 23 wherein the reaction is a photochemical reaction and one of the chemicals deposited is responsive to photo energy to change its state, including the step of passing photo energy through the glass to reach the chemicals deposited in the cavities thereby to induce the photochemical reaction.

* * * * *